US012459352B2

(12) United States Patent
Kuhajda et al.

(10) Patent No.: US 12,459,352 B2
(45) Date of Patent: Nov. 4, 2025

(54) ELECTRIC VEHICLE WITH POWERTRAIN HAVING REVERSE-ACTING CENTRIFUGAL CLUTCH

(71) Applicant: Ford Global Technologies, LLC, Dearborn, MI (US)

(72) Inventors: Nicholas Kuhajda, Berkley, MI (US); Kevin Ray Ruybal, Canton, MI (US); Christopher Golecki, Farmington Hills, MI (US); Jacob Gregory Powers, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/626,873

(22) Filed: Apr. 4, 2024

(65) Prior Publication Data

US 2025/0313082 A1     Oct. 9, 2025

(51) Int. Cl.
*B60K 17/02*     (2006.01)
*B60K 1/00*     (2006.01)
*F16D 43/10*     (2006.01)

(52) U.S. Cl.
CPC .............. *B60K 17/02* (2013.01); *B60K 1/00* (2013.01); *F16D 43/10* (2013.01)

(58) Field of Classification Search
CPC .. F16D 43/04–43/12; B60K 1/00; B60K 6/38; B60K 17/02; F16H 2061/0422
USPC ......................................... 192/104 R, 103 A
See application file for complete search history.

(56) References Cited

U.S. PATENT DOCUMENTS

| 1,030,934 | A | * | 7/1912 | Smith | F16D 43/10 |
| | | | | | 192/104 R |
| 7,255,188 | B2 | | 8/2007 | Tsukada et al. | |
| 10,759,268 | B2 | | 9/2020 | Mehlis et al. | |
| 2014/0005864 | A1 | * | 1/2014 | Holmes | B60K 6/52 |
| | | | | | 180/65.265 |

FOREIGN PATENT DOCUMENTS

| CN | 109869448 | | 6/2019 |
| DE | 102006007892 | | 8/2007 |
| DE | 102020210180 | A1 * | 2/2022 |

* cited by examiner

*Primary Examiner* — Richard M Lorence
(74) *Attorney, Agent, or Firm* — Burris Law, PLLC

(57) ABSTRACT

An electric vehicle includes an electric drive motor, transmission, and centrifugal clutch. The centrifugal clutch is drivingly coupled in a torque transmission path between the electric drive motor and the transmission. The centrifugal clutch includes a first friction plate, second friction plate, biasing member, and counterweight. The first friction plate is rotatable about an axis. The second friction plate is rotatable about the axis and axially movable relative to the first friction plate. The second friction plate is configured to frictionally engage the first friction plate to transmit torque therebetween. The biasing member biases the second friction plate toward the first friction plate. The counterweight assembly is coupled to the second friction plate and configured to apply a counterweight force on the second friction plate away from the first friction plate in response to a rotational speed of the second friction plate exceeding a predetermined rotational speed.

19 Claims, 7 Drawing Sheets

ELECTRIC VEHICLE WITH POWERTRAIN HAVING REVERSE-ACTING CENTRIFUGAL CLUTCH

FIELD

The present disclosure relates to an electric vehicle and, more particularly, to a powertrain of an electric vehicle.

BACKGROUND

The statements in this section merely provide background information related to the present disclosure and may not constitute prior art.

A typical vehicle has a prime mover (e.g., internal combustion engine or electric motor) with an output that is coupled to a transmission via a coupling device. In some instances, the coupling device is a torque converter (i.e., a fluid coupling). In other instances, the coupling device is a friction clutch, which can be manually or automatically actuated.

Referring to FIG. 1, a typical internal combustion engine (ICE) has a torque curve 110 that generally increases with engine output rotational speed (RPM) in the useful range. Conventional wisdom in the field of vehicle powertrain is that slipping of the friction clutch between the prime mover and the transmission at high RPM decreases power transmitted to the wheels, thus decreasing overall vehicle performance. Thus, some vehicles, such as top fuel drag racing vehicles for example, are equipped with a centrifugal friction clutch that couples an ICE to the transmission such that increase engine speed increases the torque holding capacity 114 of the friction clutch to inhibit the friction clutch from slipping as the torque output of the engine increases.

However, referring to FIG. 2, a typical electric motor of a battery electric vehicle (BEV) has a torque curve 210 that starts at a maximum torque and remains substantially constant until a relatively high RPM, at which the output torque begins to decrease.

Furthermore, high performance transmissions can change gear ratios in milliseconds and electric motors typically have more rotational inertia than ICEs. Thus, it can be difficult to match rotational speed of the electric motor to rotational speed of the transmission input during shift events. For example, FIG. 3 is a graph showing the electric motor output rotational speed 310, the transmission input speed 314, and the vehicle's wheel rotation speed 318 during transmission shift events 322, 326, and 330 when a typical friction clutch couples the electric motor to the transmission. In FIG. 3, the electric motor output rotational speed 310 and the transmission input speed 314 are substantially similar due to the lack of slipping in the friction clutch. However, it has been found that these quick shift events 322, 326, 330 can result in sudden spikes 334, 338, 342 in the vehicle wheel rotational speed 318, which can result in vehicle wheel slip and decreased traction.

The present disclosure addresses these and other issues with typical friction clutches in the powertrain of an electric motor driven vehicle.

SUMMARY

This section provides a general summary of the disclosure and is not a comprehensive disclosure of its full scope or all of its features.

In one form, the present disclosure provides for an electric vehicle including an electric drive motor, a transmission, and a centrifugal clutch. The transmission is switchable between a plurality of gear ratios. The centrifugal clutch is drivingly coupled in a torque transmission path between the electric drive motor and the transmission. The centrifugal clutch includes a first friction plate, a second friction plate, a biasing member, and a counterweight. The first friction plate is rotatable about an axis. The second friction plate is rotatable about the axis and axially movable relative to the first friction plate. The second friction plate is configured to frictionally engage the first friction plate to transmit torque therebetween. The biasing member applies a biasing force to the second friction plate that biases the second friction plate in a first axial direction that is toward the first friction plate. The counterweight assembly is coupled to the second friction plate and configured to apply a counterweight force on the second friction plate in a second axial direction that is away from the first friction plate in response to a rotational speed of the second friction plate exceeding a predetermined rotational speed.

According to a variety of alternative forms, that can be used with the electric vehicle of the above paragraph individually or in any combination thereof: the centrifugal clutch further comprises a base member coupled to the second friction plate for common rotation therewith about the axis, wherein the second friction plate is movable along the axis relative to the base member; the biasing member biases the second friction plate axially away from the base member and toward the first friction plate; the counterweight assembly is coupled to the base member via a first pivot connection and coupled to the second friction plate via a second pivot connection; the counterweight assembly includes a counterweight, a pivot member, and a transfer member, wherein the counterweight is coupled to the pivot member and the pivot member is coupled to the base member at the first pivot connection, wherein a first end of the transfer member is coupled to the second friction plate and a second end of the transfer member is coupled to the pivot member at the second pivot connection; the first friction plate is coupled to an input of the transmission for common rotation therewith and the base member is coupled to an output of the electric drive motor for common rotation therewith; the counterweight force is configured to be less than the biasing force for all operational speeds of the motor; the centrifugal clutch is configured to have a torque holding capacity that exceeds a torque output of the motor for all operational speeds of the motor but to permit slipping between the first friction plate and the second friction plate in response to a torque disturbance induced by shifting a gear ratio of the transmission; the electric vehicle further includes a control module configured to shift the transmission between gear ratios; the control module is configured to receive signals from a plurality of sensors and actively control motor output torque in response to the signals received from the plurality of sensors to actively control an amount of slipping of the centrifugal clutch during a gear shift of the transmission; the centrifugal clutch is configured to have a torque holding capacity that exceeds a torque output of the motor for all operational speeds of the motor but is within a predetermined torque range of the torque output at a predetermined motor speed, wherein the predetermined motor speed corresponds to a shift point of the transmission and the predetermined torque range is configured such that a torque disturbance due to the shift causes the centrifugal clutch to slip in response to shifting the transmission; the centrifugal clutch is configured to have a torque holding capacity that permits slipping between the first friction plate and the second friction plate at a predetermined torque output of the motor that corresponds to a shift point of the transmission.

In another form, the present disclosure provides for an electric vehicle including an electric drive motor, a transmission, and a centrifugal clutch. The transmission is switchable between a plurality of gear ratios. The centrifugal clutch is drivingly coupled in a torque transmission path between the electric drive motor and the transmission. The centrifugal clutch includes a first friction plate, a second friction plate, a biasing member, and a counterweight assembly. The first friction plate is rotatable about an axis. The second friction plate is rotatable about the axis and axially movable relative to the first friction plate. The second friction plate is configured to frictionally engage the first friction plate to transmit torque therebetween. The biasing member applies a biasing force to the second friction plate that biases the second friction plate in a first axial direction that is toward the first friction plate. The counterweight assembly is coupled to the second friction plate and configured to apply a counterweight force on the second friction plate in a second axial direction that is away from the first friction plate in response to a rotational speed of the second friction plate exceeding a predetermined rotational speed. The centrifugal clutch is configured to have a torque holding capacity that exceeds a torque output of the motor for all operational speeds of the motor but to permit slipping between the first friction plate and the second friction plate in response to a torque disturbance induced by shifting a gear ratio of the transmission.

According to a variety of alternative forms, that can be used with the electric vehicle of the above paragraph individually or in any combination thereof: the centrifugal clutch further includes a base member coupled to the second friction plate for common rotation therewith about the axis, wherein the second friction plate is movable along the axis relative to the base member; the counterweight assembly includes a counterweight and a pivot member, the counterweight being coupled to the pivot member, the pivot member being coupled to the base member via a first pivot connection and coupled to the second friction plate via a second pivot connection; the counterweight assembly further comprises a transfer member, wherein a first end of the transfer member is coupled to the second friction plate and a second end of the transfer member is coupled to the pivot member at the second pivot connection; the second friction plate is axially between the base member and the first friction plate; the electric vehicle further includes a control module configured to shift the transmission between the plurality of gear ratios, wherein the control module is configured to receive signals from a plurality of sensors and actively control motor output torque in response to the signals received from the plurality of sensors to actively control an amount of slipping of the centrifugal clutch during a gear shift of the transmission.

In still another form, the present disclosure provides for an electric vehicle including an electric drive motor, a transmission, and a centrifugal clutch. The transmission is switchable between a plurality of gear ratios. The centrifugal clutch is drivingly coupled in a torque transmission path between the electric drive motor and the transmission. The centrifugal clutch includes a first friction plate, a second friction plate, a biasing member, and a counterweight assembly. The first friction plate is rotatable about an axis. The second friction plate is rotatable about the axis and axially movable relative to the first friction plate. The second friction plate is configured to frictionally engage the first friction plate to transmit torque therebetween. The biasing member applies a biasing force to the second friction plate that biases the second friction plate in a first axial direction that is toward the first friction plate. The counterweight assembly is coupled to the second friction plate and configured to apply a counterweight force on the second friction plate in a second axial direction that is away from the first friction plate in response to a rotational speed of the second friction plate exceeding a predetermined rotational speed. The centrifugal clutch is configured to have a torque holding capacity that exceeds a torque output of the motor for all operational speeds of the motor but to permit slipping between the first friction plate and the second friction plate in response to a torque disturbance induced by shifting a gear ratio of the transmission. The centrifugal clutch includes a base member coupled to an output of the electric drive motor for common rotation therewith. The counterweight assembly includes a counterweight, a pivot member, and a transfer member. The counterweight is coupled to the pivot member. The pivot member is coupled to the base member via a first pivot connection and coupled to the transfer member via a second pivot connection. A first end of the transfer member is coupled to the second friction plate and a second end of the transfer member is coupled to the pivot member at the second pivot connection.

According to an alternative form, that can be used with the electric vehicle of the above paragraph: the electric vehicle can further include a control module configured to shift the transmission between the plurality of gear ratios, wherein the control module is configured to receive signals from a plurality of sensors and actively control motor output torque in response to the signals received from the plurality of sensors to actively control an amount of slipping of the centrifugal clutch during a gear shift of the transmission.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
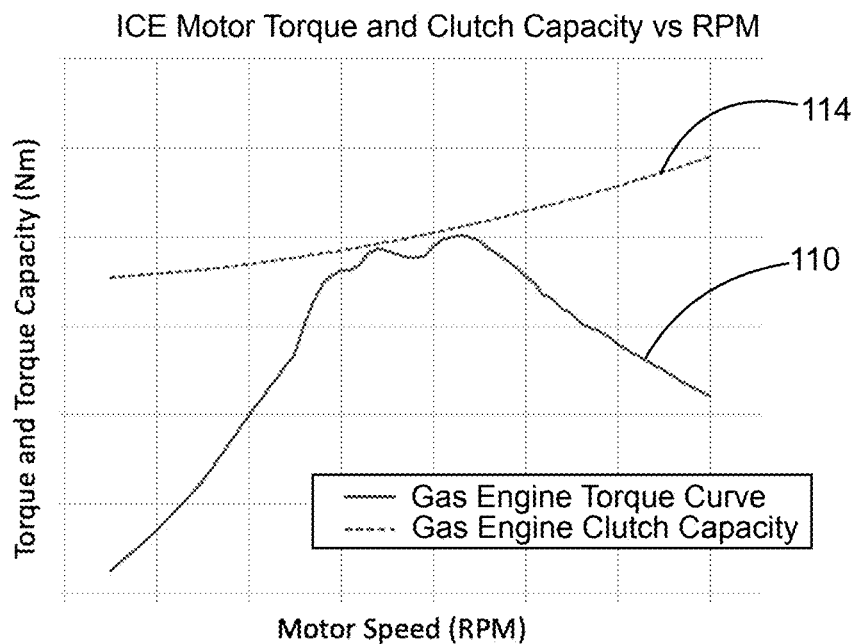
FIG. 1 is a graph showing a typical internal combustion engine torque and a traditional centrifugal clutch torque capacity versus motor speed.
Figure 2:
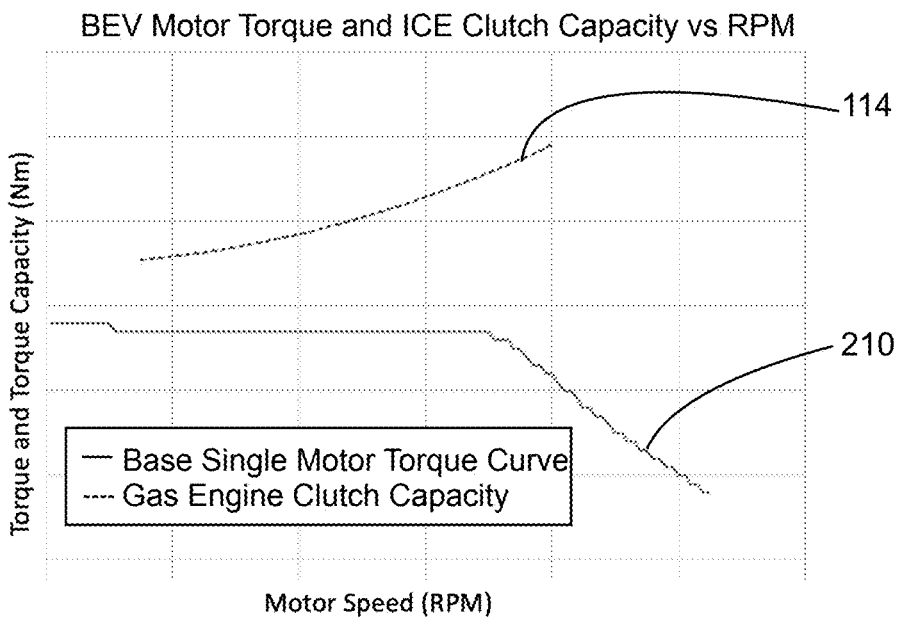
FIG. 2 is a graph showing a typical electric motor torque and a traditional centrifugal clutch torque capacity versus motor speed.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 4:
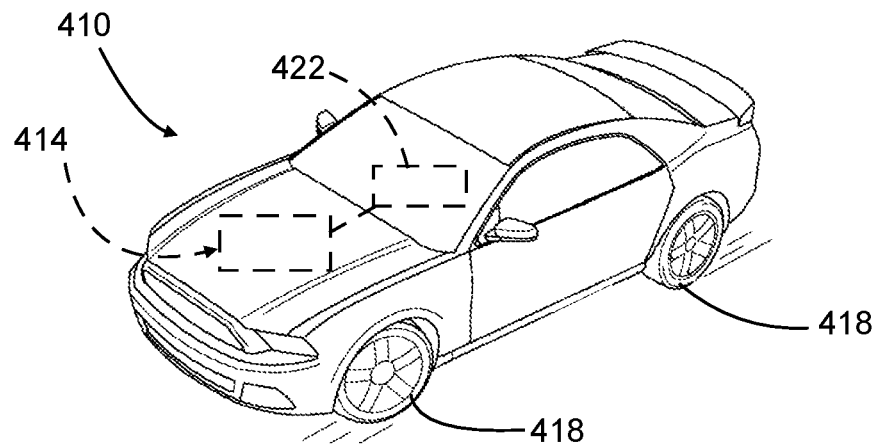
FIG. 4 is a schematic perspective view of a vehicle according to the teachings of the present disclosure.

Referring to FIG. 4, a vehicle 410 is illustrated. The vehicle 410 includes a powertrain 414 configured to power at least one set of vehicle wheels (e.g., vehicle wheels 418) in order to propel the vehicle 410. In one form, the vehicle may be a rear-wheel drive (RWD) vehicle, though other configurations can be used, such as front-wheel drive (FWD), all-wheel drive (AWD), or four-wheel drive (4WD) for example.

In another form, the vehicle 410 can include more than one instance of the powertrain 414. In one such form, each powertrain 414 provides power to a dedicated set of the vehicle wheels 418. In still another form, each powertrain 414 can provide power to a dedicated one of the vehicle wheels 418.

While a passenger-style automobile is illustrated, the vehicle 410 may be any suitable type of vehicle, including but not limited to race vehicles, off-road vehicles, trucks, recreational vehicles (RVs), or military vehicles, for example. While not specifically shown, those of skill in the art will appreciate that the powertrain 414 of the present disclosure may also be applicable to non-vehicle applications such as farm or industrial equipment, for example.

In the example provided, the vehicle 410 is an electric vehicle and includes a vehicle power storage unit 422 (e.g., vehicle battery or hydrogen tank with fuel cell). The vehicle power storage unit 422 provides electrical power to the powertrain 414 and the powertrain 414 converts the electrical power to mechanical power to drive the vehicle wheels 418. In another form, not specifically shown, the vehicle 410 can be a hybrid vehicle such that an internal combustion engine can also provide power to the same vehicle wheels 418. In still another form, the vehicle 410 can be configured such that an internal combustion engine (not shown) can power one set of the vehicle wheels 418 while the powertrain 414 can power a different set of the vehicle wheels 418.

Figure 5:
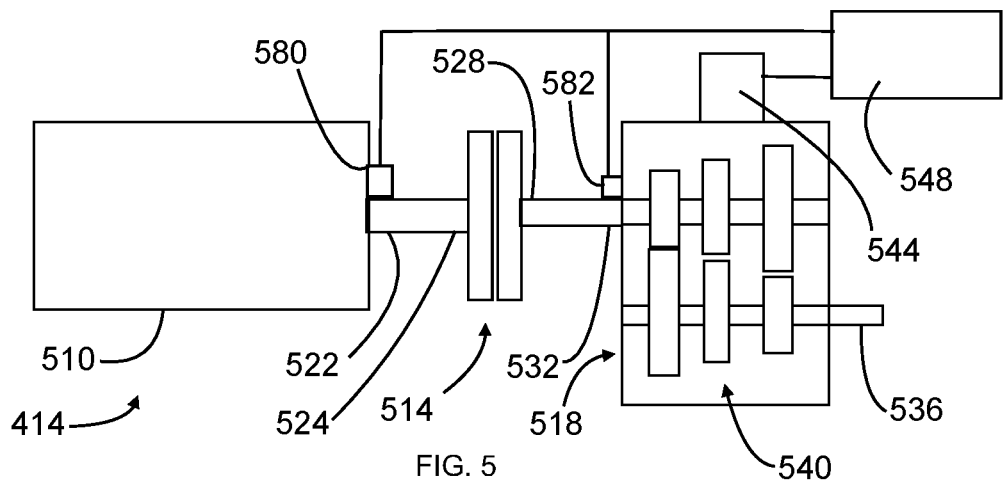
FIG. 5 is a schematic view of a powertrain of the vehicle of FIG. 4, including an electric motor, a transmission, and a centrifugal clutch according to the teachings of the present disclosure.

Referring to FIG. 5, the powertrain 414 includes an electric motor 510, a centrifugal clutch 514, and a transmission 518. The electric motor 510 can be any suitable type of electric motor that receives electrical power from the vehicle power storage unit 422 (FIG. 4) and converts the electrical power to rotational power. The electric motor 510 includes a motor output 522 and is configured to rotate the motor output 522. The motor output 522 is coupled to a clutch input 524 of the centrifugal clutch 514. A clutch output 528 of the centrifugal clutch 514 is coupled to a transmission input 532 of the transmission 518. A transmission output 536 of the transmission 518 is coupled in any suitable manner to the vehicle wheels 418 (FIG. 4) to be configured to drive the vehicle wheels 418 to propel the vehicle 410 (FIG. 4).

In one form, the transmission output 536 may be coupled to a propshaft (not shown) that provides power to a drive axle (not shown) of the vehicle 410 (FIG. 4) that may optionally include a differential (not shown), though other configurations can be used. In another form, the transmission output 536 may be directly coupled to a drive axle (not shown) of the vehicle 410 or to a dedicated one of the vehicle wheels 418 (FIG. 4).

The centrifugal clutch 514 is configured to couple the motor output 522 to the transmission input 532 to provide rotary power therebetween.

The transmission 518 can be any suitable transmission and includes a transmission gearset 540 with a plurality of gear ratios disposed between the transmission input 532 and the transmission output 536. The transmission 518 can include an actuator 544 coupled to the transmission gearset 540 and configured to select one or more gear ratios of the transmission gearset 540. The actuator 544 may be any suitable type of actuator. In one form, the actuator 544 is a manual shifter that is physically and manually moved between ratios by an operator (not shown). In another form, the actuator 544 is an electric or hydraulic actuator controlled by a controller 548 to switch between ratios automatically or in response to input from an operator (not shown).

Figure 6:
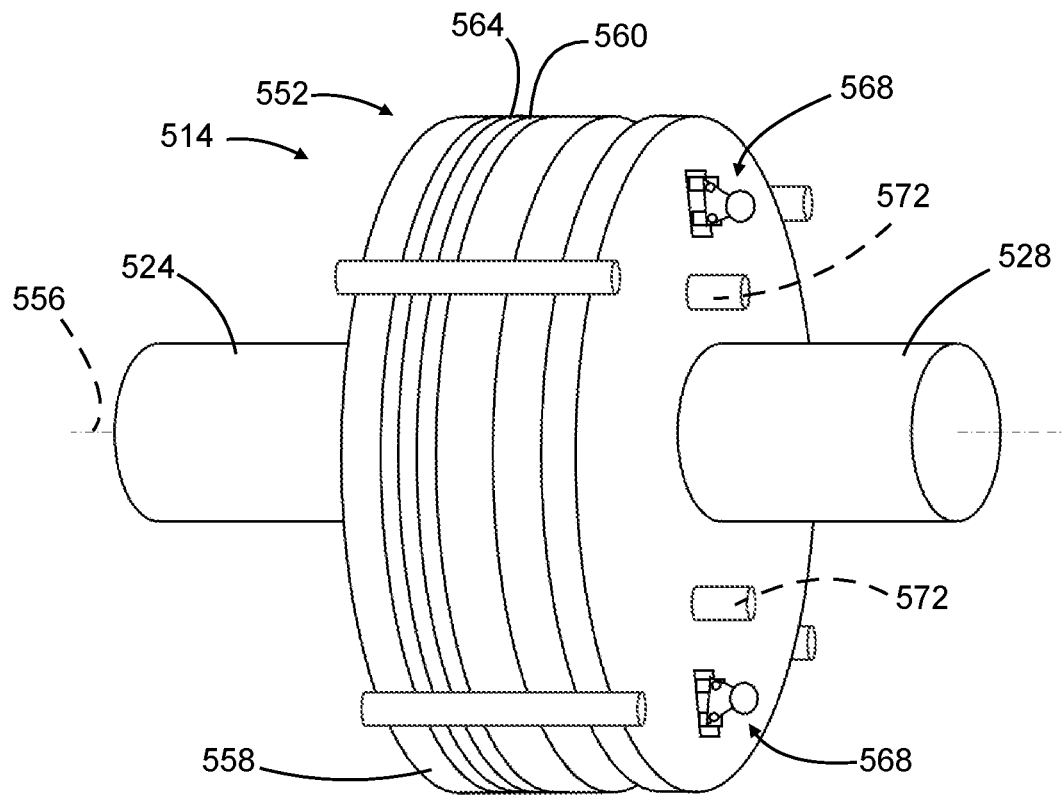
FIG. 6 is a schematic perspective view of the centrifugal clutch of FIG. 5.
Figure 7:
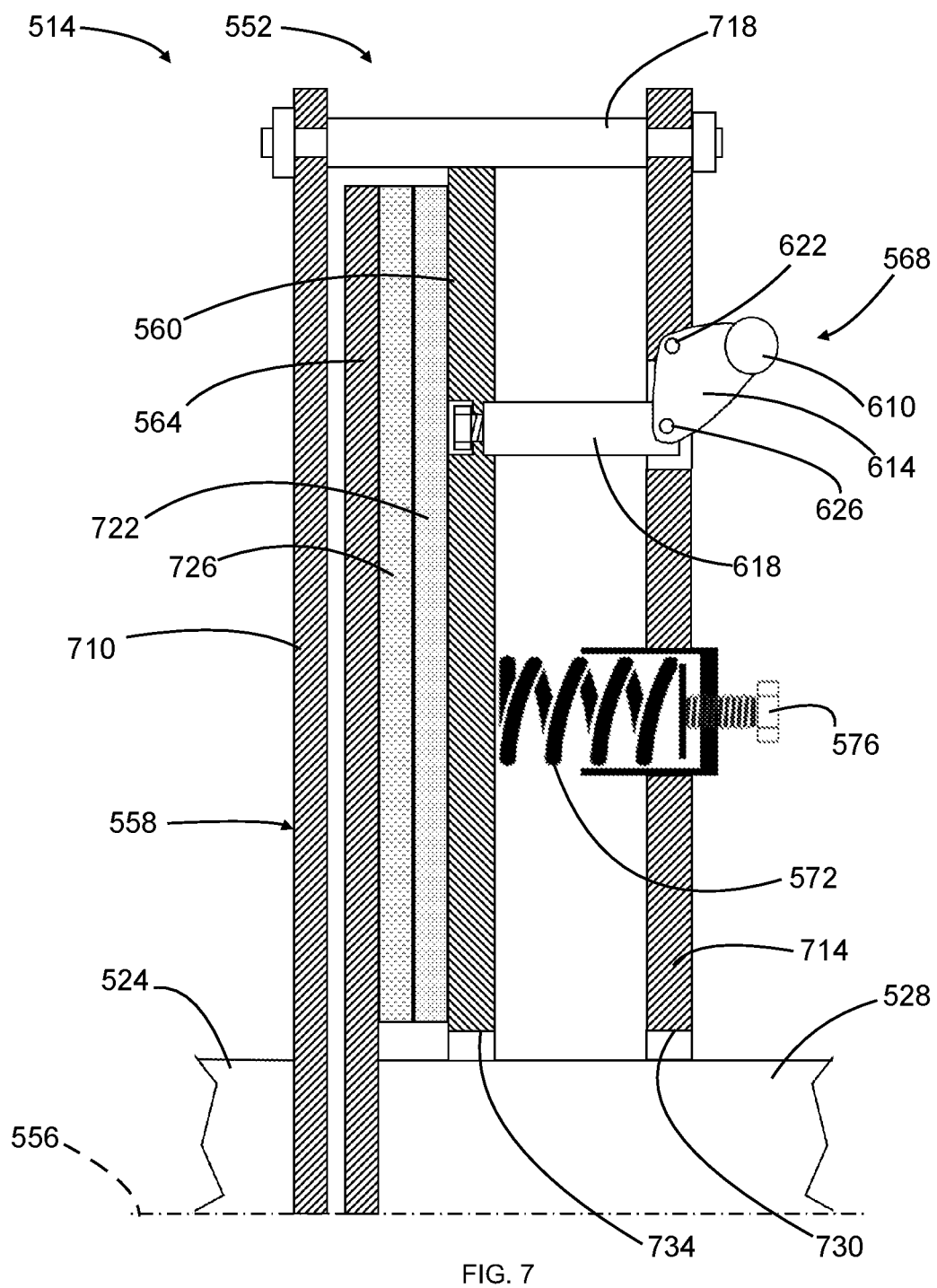
FIG. 7 is a schematic partial cross-sectional view of a portion of the centrifugal clutch of FIG. 5.

Referring to FIGS. 6 and 7, the centrifugal clutch 514 includes the clutch input 524, the clutch output 528, and a clutch mechanism 552, all rotatable about a central axis 556. The clutch input 524 and the clutch output 528 are coaxially disposed about the central axis 556. The clutch mechanism 552 is configured to transmit torque between the clutch input 524 and the clutch output 528 in a manner that decreases the torque capacity of the centrifugal clutch 514 at higher rotational speeds (i.e., revolutions per minute; "RPM") based on the rotational speed.

The clutch mechanism 552 includes a housing 558, at least one input friction plate (e.g., input friction plate 560, also referred to as a pressure plate), at least one output friction plate (e.g., output friction plate 564), at least one counterweight assembly (e.g., counterweight assembly 568), and at least one biasing member (e.g., biasing member 572). The housing 558 is coupled to the clutch input 524 for common rotation about the central axis 556. Each input friction plate (e.g., input friction plate 560) is coupled to the housing 558 for common rotation about the central axis 556 but is axially movable relative to the housing 558. Each output friction plate (e.g., output friction plate 564) is coupled to the clutch output 528 for common rotation about the central axis 556.

In the example provided, the housing 558 includes a first base member 710, a second base member 714, and at least one connecting member 718, though other configurations can be used. The first base member 710 is coupled directly to the clutch input 524, such as via welding, bolts, rivet, splines, etc., for common rotation therewith. The second base member 714 is axially spaced apart from the first base member 710 and fixedly coupled to the first base member 710 by the plurality of connecting members 718.

In the example provided, there are a plurality of the connecting members 718 with each being a cylindrical shaft and spaced apart from one another in a circumferential direction about the central axis 556. One end of each connecting member 718 is coupled to the first base member 710 and the other end is coupled to the second base member 714. The connecting members 718 are configured to inhibit the second base member 714 from moving axially relative to the first base member 710 and to couple the second base member 714 to the first base member 710 for common rotation. In one alternative configuration, not specifically shown, the plurality of connecting members 718 can be replaced by a single connecting member that forms a generally drum or cylindrical shape about the central axis 556.

The clutch input 524 and the clutch output 528 are configured to be generally rotatable relative to one another and the input friction plate 560 and output friction plate 564 are configured to frictionally couple the clutch input 524 to the clutch output 528 for common rotation about the central axis 556. As such, the clutch input 524 and clutch output 528 can rotate relative to each other if the input friction plate 560 and the output friction plate 564 are spaced apart from one another or if a torque differential between them exceeds the frictional torque holding capacity of the engagement between the input friction plate 560 and the output friction plate 564.

As such, the clutch mechanism 552 can operate in a coupled condition in which substantially all torque is transmitted between the clutch input 524 and the clutch output 528, and a slipping mode in which some, but not all, of the torque is transmitted between the clutch input 524 and the clutch output 528. In some forms, the clutch mechanism 552 may optionally be configured to also operate in a disengaged mode in which the input friction plate 560 and output friction plate 564 are disengaged from one another and torque is not transmitted.

In the example provided, a single input friction plate 560 and a single output friction plate 564 are used though other configurations can be used. In the example provided, the output friction plate 564 is fixed axially to the clutch output 528, though other configurations can be used. A side of the input friction plate 560 that faces toward the output friction plate 564 includes a friction material 722 (e.g., one or more friction pads) attached thereto. A side of the output friction plate 564 that faces toward the input friction plate 560 includes a friction material 726 (e.g., one or more friction pads) attached thereto. As such, contact between the friction materials 722, 726 of the input friction plate 560 and output friction plate 564 permit frictional coupling of the input friction plate 560 to the output friction plate 564.

In one alternative configuration, not specifically shown, the output friction plate 564 can be axially movable relative to the clutch output 528.

In another alternative configuration, not specifically shown, more than one input friction plate and more than one output friction plate can be used. In such a configuration, the input friction plates are coupled to the clutch input 524 for common rotation about the central axis 556 but are axially movable relative to the clutch input 524 and the output friction plates are coupled to the clutch output 528 for common rotation about the central axis 556 but are axially movable relative to the clutch input 524. In such a configuration, the input friction plates and output friction plates are positioned in an alternating manner along the axial direction.

Returning to the example provided, the output friction plate 564 can be axially between the first base member 710 and the input friction plate 560. The input friction plate 560 can be axially between the output friction plate 564 and the second base member 714. The clutch output 528 can extend axially through an aperture 730 in the second base member 714 and an aperture 734 in the input friction plate 560 to be coupled to the output friction plate 564, such as via welding, bolts, rivets, splines, etc., for common rotation.

Each biasing member 572 biases the input friction plate 560 and the output friction plate 564 into engagement with one another. In the example provided, each biasing member 572 is mounted between the housing 558 (e.g., to the second base member 714) and the input friction plate 560 to act on the input friction plate 560 to bias the input friction plate 560 in the axial direction toward the output friction plate 564.

In the example provided, the biasing member 572 includes a coil spring, though other configurations can be used, such as other types of springs or resilient materials. A force applied by the biasing member 572 can optionally be adjustable. In the example provided, an adjustment screw 576 threadably engages the second base member 714 and is between the second base member 714 and the biasing member 572 such that screwing the adjustment screw 576 in one direction can compresses the biasing member 572 between the second base member 714 and the input friction plate 560 to increase the biasing force. As such, screwing the adjustment screw 576 in the opposite direction decreases the biasing force.

Each counterweight assembly 568 is configured such that during rotation of the clutch mechanism 552, the counterweight assembly 568 applies a force in a direction that counteracts the biasing force from the biasing member 572. Each counterweight assembly 568 is configured such that the force applied by it increases as the rotational speed of the clutch mechanism 552 increases.

In the example provided, the counterweight assembly 568 includes a weight 610, a pivot body 614, and a transfer member 618. The weight 610 is mounted to the pivot body 614. The pivot body 614 is coupled to the second base member 714 for common rotation therewith about the central axis 556. The pivot body 614 is coupled to the second base member 714 at a first pivot location 622 such that the pivot body 614 can pivot about the first pivot location 622 relative to the housing 558 while rotating about the central axis 556 with the housing 558. The weight 610 is positioned relative to the first pivot location 622 such that rotation of the housing 558 about the central axis 556 produces a centrifugal force on the weight 610 in a direction radially outward relative to the central axis 556.

The weight 610 can be any suitable component coupled to the pivot body 614 and having sufficient mass to produce this centrifugal force. In the example provided, the weight 610 can be removable and different mass weights can be interchangeably coupled to the pivot body 614 to tune the centrifugal force. In other forms, the weight 610 can be permanently coupled to and/or integrally formed with the pivot body 614.

One end of the transfer member 618 is rigidly coupled to the input friction plate 560. The opposite end of the transfer member 618 is coupled to the pivot body 614 at a second pivot location 626 such that the pivot body 614 can pivot relative to the transfer member 618. The second pivot location 626 is positioned such that the centrifugal force that causes the pivot body 614 to pivot about the first pivot location 622 is translated to a force that pulls on the transfer member 618 in an axial direction away from the output friction plate 564. As such, as the rotational speed of the housing 558 increases, the overall force acting on the input friction plate 560 in the axial direction toward the output friction plate 564 decreases and, thus, the frictional force coupling the input friction plate 560 to the output friction plate 564 decreases.

Figure 8:
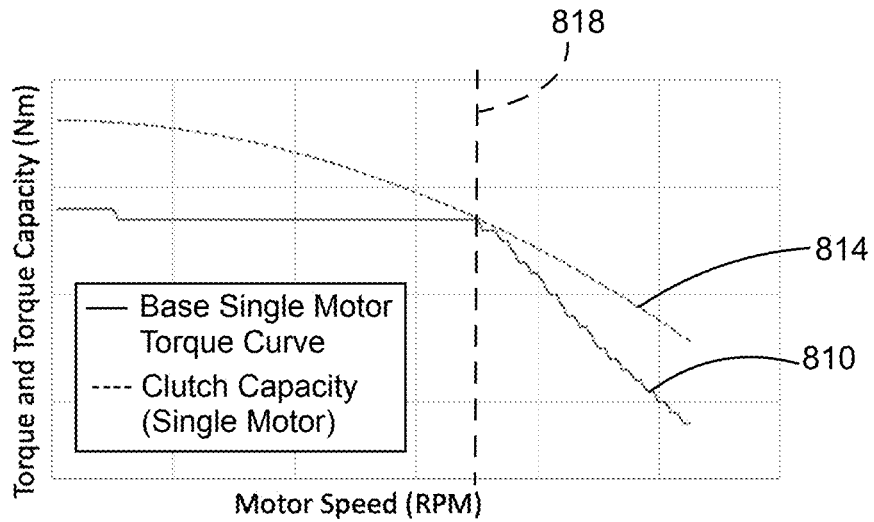
FIG. 8 is a graph showing torque output of the electric motor of FIG. 5 and the torque capacity of the centrifugal clutch of FIG. 5 versus motor speed.

Referring to FIG. 8, a graph showing the torque output 810 of the electric motor 510 (FIG. 5) and the torque capacity 814 (also referred to as a torque holding capacity) of the centrifugal clutch 514 (FIGS. 5-7) are illustrated versus motor rotational speed (i.e., rotational speed of the motor output 522; FIG. 5). The torque output 810 starts at substantially maximum torque and is substantially constant for most speeds but then decreases above a threshold speed 818.

The mass of the weight 610 (FIG. 7), the geometry of the pivot body 614 (FIG. 7), and the biasing force of the biasing member 572 (FIG. 7) are configured such that the torque capacity 814 decreases with increased motor speed above the threshold speed 818.

In the example provided, mass of the weight 610 (FIG. 7), the geometry of the pivot body 614 (FIG. 7), and the biasing force of the biasing member 572 (FIG. 7) can be configured such that the torque capacity 814 decreases across the entire range of motor speeds, though other configurations can be used such as remaining substantially constant for lower motor speeds and then decreasing for higher motor speeds.

In one form, the mass of the weight 610 (FIG. 7), the geometry of the pivot body 614 (FIG. 7), and the biasing force of the biasing member 572 (FIG. 7) are configured such that the torque capacity 814 remains greater than or equal to the torque output 810 of the electric motor 510 (FIG. 5) for all motor speeds, including at and above the threshold speed 818.

In another form, the mass of the weight 610 (FIG. 7), the geometry of the pivot body 614 (FIG. 7), and the biasing force of the biasing member 572 (FIG. 7) are configured such that the torque capacity 814 remains greater than the torque output 810 of the electric motor 510 (FIG. 5) for all motor speeds, including at and above the threshold speed 818.

In the example provided, the mass of the weight 610 (FIG. 7), the geometry of the pivot body 614 (FIG. 7), and the biasing force of the biasing member 572 (FIG. 7) are configured such that the torque capacity 814 remains greater than the torque output 810 of the electric motor 510 (FIG. 5) but is within a predetermined torque range of the torque output 810 at a predetermined motor speed. In other words, the input friction plate 560 and the output friction plate 564 can be configured to never fully disengage. The predetermined motor speed corresponds to a shift point of the transmission 518 (FIG. 5) and can be a range of motor speeds. In other words, the predetermined motor speed is the speed at which the transmission 518 is configured to be shifted to a higher gear (e.g., first gear to second gear, or second gear to third gear, etc.)

In one form, this predetermined motor speed is at or above the threshold speed 818, though other configurations can be used, including below the threshold speed 818.

The predetermined torque range is configured such that the clutch mechanism 552 (FIG. 7) is configured to couple the clutch input 524 (FIG. 7) to the clutch output 528 (FIG. 7) for common rotation without slipping for all speeds of the electric motor 510 (FIG. 5) (or at least all speeds below the predetermined motor speed) if the transmission 518 (FIG. 5) remains in a constant gear ratio. However, the predetermined torque range is configured such that a torque disturbance (e.g., inertial impulse) caused by shifting the transmission 518 between gear ratios (e.g., from a lower gear to a higher gear) causes a torque differential between the clutch input 524 and the clutch output 528 to exceed the torque capacity 814. As such, the clutch mechanism 552 is configured to slip in response to the torque disturbance caused by shifting the transmission 518 at the predetermined motor speed.

In one form, the torque capacity 814 can be set to be configured to deliver a desired tradeoff between a plurality of related performance requirements, e.g., maintaining tire traction, achieving consistent shift speed, minimizing clutch slip to improve system efficiency and clutch wear, and smoothing power delivery across the shift, etc.

In one form, for example, the torque capacity 814 can be set to achieve a predetermined clutch slipping range such that inertial impulse causes the clutch to slip without losing traction at the tire. In another form, the clutch capacity 814 can be set to permit slippage of the centrifugal clutch 514 but minimize the amount of time the centrifugal clutch 514 slips to improve system efficiency and clutch wear and may optionally permit some slippage of the tire (i.e., vehicle wheel 418) but less than would occur with a non-slipping clutch.

In another form, sensors 580, 582 can be used to determine speed and/or torque at various locations within the system and the controller 548 can be configured to use closed loop motor control algorithms to augment the clutch behavior. In other words, the controller 548 can actively control an amount of slip of the centrifugal clutch 514 by actively controlling output torque of the motor 510. In one such example, sensors can detect, or be used to determine, the speed of the motor output 522 and speed of the transmission input 532. In this example, if the controller 548 determines that the clutch capacity 814 is less than expected, the controller 548 can use closed loop motor control algorithms to actively reduce motor torque to reduce the duration of a shift and smoothly relock the clutch. Such an algorithm may optionally be combined with estimation of clutch capacity using measured speed and/or torque feedback signals to adapt controls and characterize mechanical performance of the clutch.

In one alternative form, the clutch mechanism 552 can be configured to slip to some extent immediately before the shift event and regain full coupling after the shift has occurred.

Figure 3:
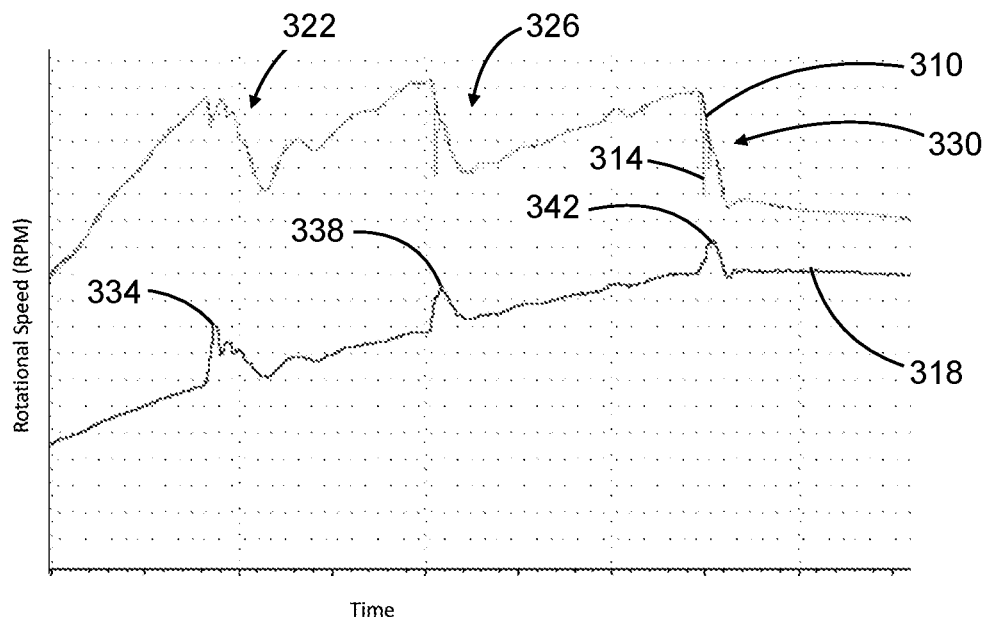
FIG. 3 is a graph showing electric motor output rotational speed, transmission input speed, and vehicle wheel rotation speed versus time during transmission shift events when a typical friction clutch couples the electric motor to the transmission.
Figure 9:
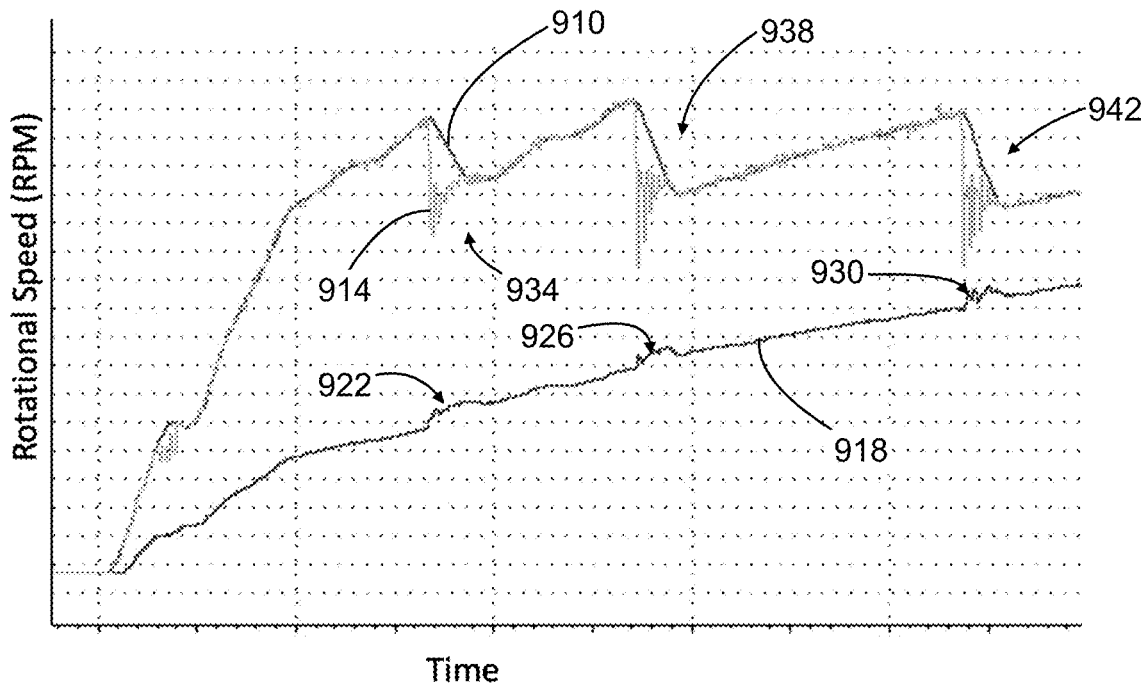
FIG. 9 is a graph showing electric motor output rotational speed, transmission input speed, and vehicle wheel rotation speed versus time for the powertrain of FIG. 5 during transmission shift events.

Referring to FIG. 9, the motor output rotational speed 910 (e.g., rotational speed of the motor output 522; FIG. 5), transmission input speed 914 (e.g., rotational speed of the transmission input 532; FIG. 5), and vehicle wheel rotation speed 918 (e.g., rotational speed of the vehicle wheels 418 (FIG. 4) or the transmission output 536; FIG. 5) versus time is illustrated. The slipping of the clutch mechanism 552 (FIG. 7) can be seen in the graph of FIG. 9 as the motor output rotational speed 910 transitions (e.g., decreases) smoothly during shift events 934, 938, 942, as compared to transmission input speed 914. As can be seen by comparing the graph of FIG. 9 to the graph of FIG. 3, the vehicle 410 (FIG. 4) of the present disclosure, with the powertrain 414 (FIG. 5) discussed herein greatly decreases the disturbances (e.g., disturbances 922, 926, and 930) in the vehicle wheel rotation speed 918 during these shift events 934, 938, 942.

Figure 10:
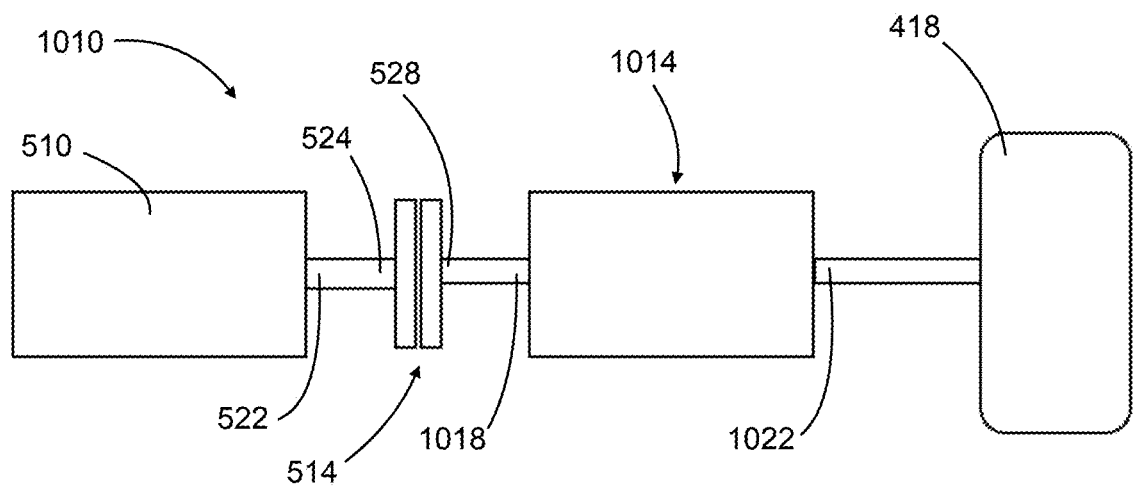
FIG. 10 is a schematic view of a powertrain of a second configuration of the vehicle of FIG. 4 according to the teachings of the present disclosure.

Referring to FIG. 10, a power train 1010 of an alternative configuration is illustrated. The power train 1010 is similar to the powertrain 414 except as otherwise shown or described herein. As such, similar components are identified with similar numbers and only differences are described in detail herein. In the example provided, the power train 1010 includes the electric motor 510, the motor output 522, the centrifugal clutch 514, clutch input 524, and the clutch output 528, arranged substantially similar to that described above. In the powertrain 1010, the transmission 518 optionally replaced with a gear reduction gearbox 1014 which can provide a single speed gear reduction between an input 1018 and an output 1022 of the gear reduction gearbox 1014. The input 1018 is drivingly coupled to the clutch output 528 to receive torque therefrom and may optionally be directly coupled thereto. The output 1022 is drivingly coupled to a single vehicle wheel 418. In a configuration in which the optional gear reduction gearbox 1014 is not included, the clutch output 528 can be drivingly coupled to the vehicle wheel 418.

In the example provided, another instance of the power train 1010 would be configured to drive a different vehicle wheel 418. For example, the rear vehicle wheels 418 and/or the front vehicle wheels can be driven by corresponding instances of the powertrain 1010.

Figure 11:
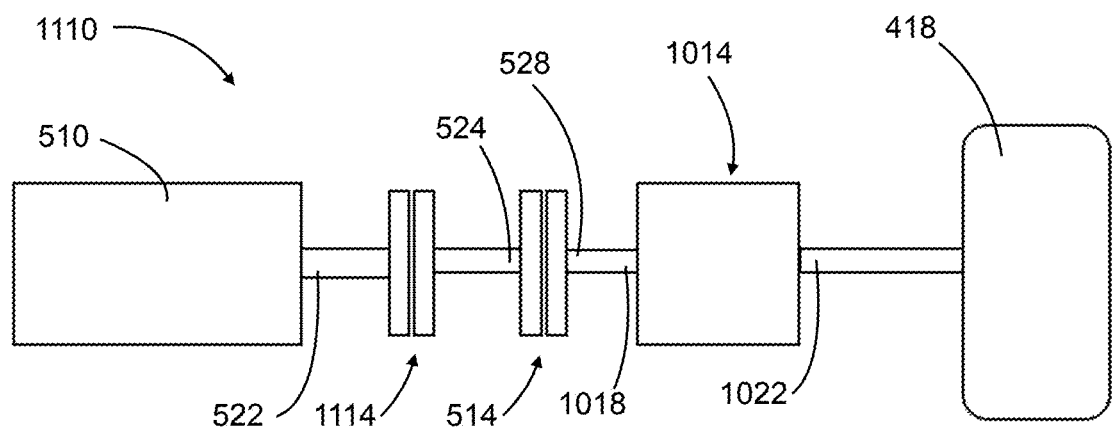
FIG. 11 is a schematic view of a powertrain of a third configuration of the vehicle of FIG. 4 according to the teachings of the present disclosure.

Referring to FIG. 11, a power train 1110 of an alternative configuration is illustrated. The power train 1110 is similar to the powertrain 1010 except as otherwise shown or described herein. As such, similar components are identified with similar numbers and only differences are described in detail herein. In the example provided, the power train 1110 includes the electric motor 510, the motor output 522, the centrifugal clutch 514, clutch input 524, the clutch output 528, arranged substantially similar to that described above and may optionally include the gear reduction gearbox 1014 arranged as described above. The power train 1110 further includes a disconnect clutch 1114 located in the torque transmission path between the electric motor 510 and the vehicle wheel 418. In the example provided, the disconnect clutch 1114 drivingly couples the motor output 522 to the clutch input 524.

In an alternative configuration, not specifically shown, the disconnect clutch 1114 can drivingly couple the clutch output 528 to the input 1018. In yet another configuration, not specifically shown, the disconnect clutch 1114 can drivingly couple the output 1022 to the vehicle wheel 418. In a still another configuration, not specifically shown, without the gear reduction gearbox 1014, the disconnect clutch 1114 can drivingly couple the clutch output 528 to the vehicle wheel 418.

The disconnect clutch 1114 can act as an overspeed protection mechanism. In normal operation, the disconnect clutch 1114 can open at high vehicle speeds and can close at lower vehicle speeds, to inhibit the electric motor 510 from being back-driven by the vehicle wheels 418 at speeds greater than the electric motor 510 is designed for. In the event of the disconnect clutch 1114 not operating as intended, the centrifugal clutch 514 can act as a back-up to protect the electric motor 510 at high speeds. In such a configuration, the centrifugal clutch 514 may disconnect fully or may simply permit slipping to protect the electric motor 510.

Figure 12:
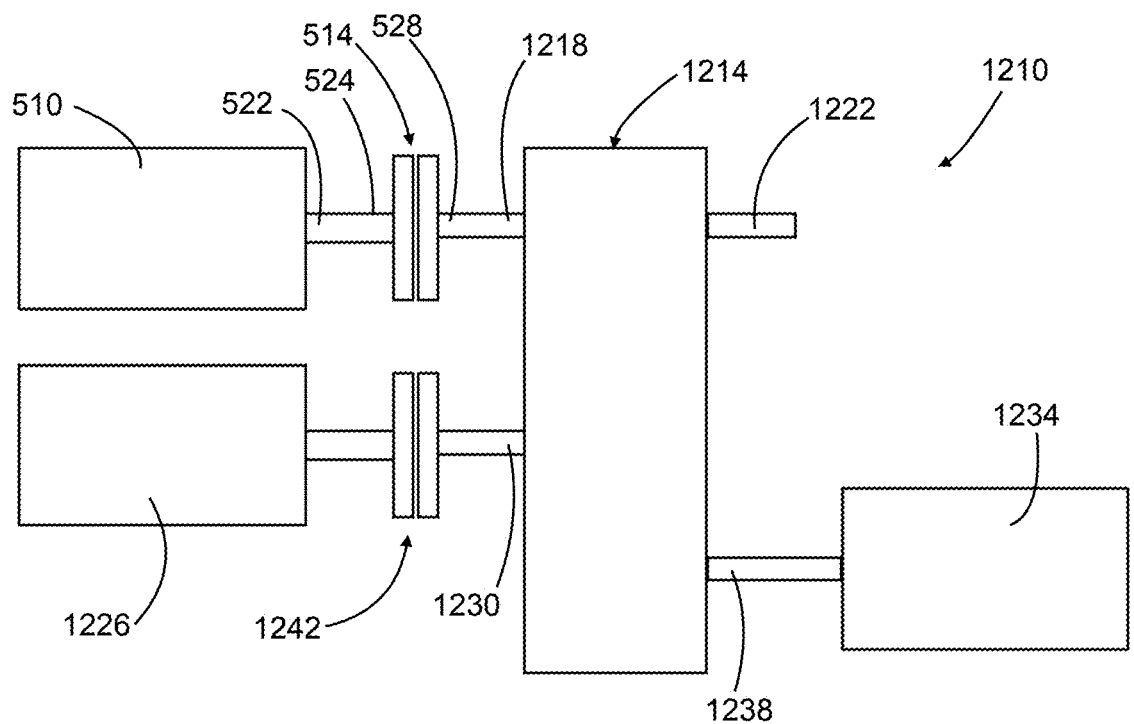
FIG. 12 is a schematic view of a powertrain of a third configuration of the vehicle of FIG. 4 according to the teachings of the present disclosure.

Referring to FIG. 12, a power train 1210 of an alternative configuration is illustrated. The power train 1210 is similar to the powertrain 414 except as otherwise shown or described herein. As such, similar components are identified with similar numbers and only differences are described in detail herein. In the example provided, the power train 1210 includes the electric motor 510, the motor output 522, the centrifugal clutch 514, clutch input 524, and the clutch output 528, arranged substantially similar to that described above. The clutch output 528 is drivingly coupled to a transmission 1214 (e.g., an electric variable transmission) via an input 1218 of the transmission 1214. An output 1222 of the transmission 1214 is drivingly coupled to the vehicle wheels 418 in any suitable manner, similar to transmission output 536 (FIG. 5) discussed above. The power train 1210 also includes at least one additional prime mover drivingly coupled to the transmission 1214 via an additional input of the transmission.

The additional prime mover(s) may be an additional electric motor or an internal combustion engine. In the example provided, an additional electric motor 1226 is drivingly coupled to an additional input 1230 of the transmission 1214 and an internal combustion engine 1234 is drivingly coupled to another input 1238 of the transmission 1214, though other configurations can be used. The additional electric motor 1226 can be coupled to the input 1230 a centrifugal clutch 1242. The centrifugal clutch 1242 can be similar to the centrifugal clutch 514.

In an alternative configuration, not specifically shown, the additional electric motor 1226 is omitted and the transmission 1214 is only driven by the electric motor 510 and the internal combustion engine 1234. In another alternative configuration, not shown, the internal combustion engine 1234 is omitted and the transmission 1214 is only driven by the two electric motors 510 and 1226.

Figure 13:
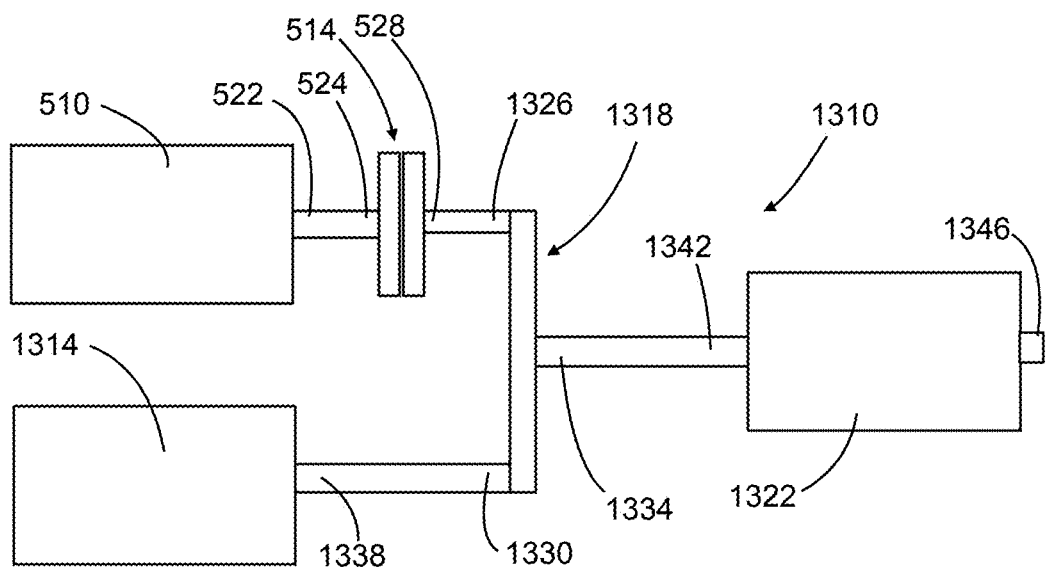
FIG. 13 is a schematic view of a powertrain of a third configuration of the vehicle of FIG. 4 according to the teachings of the present disclosure.

Referring to FIG. 13, power train 1310 of an alternative configuration is illustrated. The power train 1310 is similar to the powertrain 414 except as otherwise shown or described herein. As such, similar components are identified with similar numbers and only differences are described in detail herein. In the example provided, the power train 1310 includes the electric motor 510, the motor output 522, the centrifugal clutch 514, clutch input 524, and the clutch output 528, arranged substantially similar to that described above. The power train 1310 also includes an internal combustion engine 1314, a summing gear set 1318, and a transmission 1322.

The summing gear set 1318 can be any suitable set of gears, belts, chains, or similar, configured to add the torque input from more than one input and output the sum of that torque to a common output. In the example provided, the summing gear set 1318 has a first input 1326, a second input 1330, and an output 1334. The first input 1326 is drivingly coupled to the clutch output 528. The second input 1330 is drivingly coupled to an output 1338 of the internal combustion engine 1314. The output 1334 is drivingly coupled to an input 1342 of the transmission 1322. The transmission 1322 can be any suitable transmission and can be similar to the transmission 518 (FIG. 5) discussed above. An output 1346 of the transmission 1322 is drivingly coupled to the vehicle wheels 418 in any suitable manner, similar to transmission output 536 (FIG. 5) discussed above. In this configuration, the electric motor 510 can provide power at low speeds (e.g., at launch) and the centrifugal clutch 514 can disconnect or slip at high speeds while the internal combustion engine 1314 can still provide power.

Accordingly, the teachings of the present disclosure provide for an electric vehicle that provides smooth operation during transmission shifts while also permitting various hybrid power trains.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric vehicle comprising:
   an electric drive motor;
   a transmission switchable between a plurality of gear ratios; and
   a centrifugal clutch drivingly coupled in a torque transmission path between the electric drive motor and the transmission, the centrifugal clutch including:
   a first friction plate rotatable about an axis;
   a second friction plate rotatable about the axis and axially movable relative to the first friction plate, the second friction plate being configured to frictionally engage the first friction plate to transmit torque therebetween;
   a biasing member that applies a biasing force to the second friction plate that biases the second friction plate in a first axial direction that is toward the first friction plate; and
   a base member coupled to the second friction plate for common rotation therewith about the axis, the second friction plate is movable along the axis relative to the base member; and
   a counterweight assembly coupled to the second friction plate and configured to apply a counterweight force on the second friction plate in a second axial direction that is away from the first friction plate in response to a rotational speed of the second friction plate exceeding a predetermined rotational speed, the counterweight assembly is coupled to the base member for common rotation therewith.

2. The electric vehicle according to claim 1, wherein the biasing member biases the second friction plate axially away from the base member and toward the first friction plate.

3. The electric vehicle according to claim 1, wherein the counterweight assembly is coupled to the base member via a first pivot connection and coupled to the second friction plate via a second pivot connection.

4. The electric vehicle according to claim 3, wherein the counterweight assembly includes a counterweight, a pivot member, and a transfer member, wherein the counterweight is coupled to the pivot member and the pivot member is coupled to the base member at the first pivot connection, wherein a first end of the transfer member is coupled to the second friction plate and a second end of the transfer member is coupled to the pivot member at the second pivot connection.

5. The electric vehicle according to claim 1, wherein the first friction plate is coupled to an input of the transmission for common rotation therewith and the base member is coupled to an output of the electric drive motor for common rotation therewith.

6. The electric vehicle according to claim 1, wherein the counterweight force is configured to be less than the biasing force for all operational speeds of the motor.

7. The electric vehicle according to claim 1, wherein the centrifugal clutch is configured to have a torque holding capacity that exceeds a torque output of the motor for all operational speeds of the motor but to permit slipping between the first friction plate and the second friction plate in response to a torque disturbance induced by shifting a gear ratio of the transmission.

8. The electric vehicle according to claim 1, further comprising a control module configured to shift the transmission between gear ratios.

9. The electric vehicle according to claim 8, wherein the control module is configured to receive signals from a plurality of sensors and actively control motor output torque in response to the signals received from the plurality of sensors to actively control an amount of slipping of the centrifugal clutch during a gear shift of the transmission.

10. The electric vehicle according to claim 1, wherein the centrifugal clutch is configured to have a torque holding capacity that exceeds a torque output of the motor for all operational speeds of the motor but is within a predetermined torque range of the torque output at a predetermined motor speed, wherein the predetermined motor speed corresponds to a shift point of the transmission and the predetermined torque range is configured such that a torque disturbance due to the shift causes the centrifugal clutch to slip in response to shifting the transmission.

11. The electric vehicle according to claim 1, wherein the centrifugal clutch is configured to have a torque holding capacity that permits slipping between the first friction plate and the second friction plate at a predetermined torque output of the motor that corresponds to a shift point of the transmission.

12. An electric vehicle comprising:
an electric drive motor;
a transmission switchable between a plurality of gear ratios; and
a centrifugal clutch drivingly coupled in a torque transmission path between the electric drive motor and the transmission, the centrifugal clutch including:
a first friction plate rotatable about an axis;
a second friction plate rotatable about the axis and axially movable relative to the first friction plate, the second friction plate being configured to frictionally engage the first friction plate to transmit torque therebetween;
a biasing member that applies a biasing force to the second friction plate that biases the second friction plate in a first axial direction that is toward the first friction plate; and
a counterweight assembly coupled to the second friction plate and configured to apply a counterweight force on the second friction plate in a second axial direction that is away from the first friction plate in response to a rotational speed of the second friction plate exceeding a predetermined rotational speed,
wherein the centrifugal clutch is configured to have a torque holding capacity that exceeds a torque output of the motor for all operational speeds of the motor but to permit slipping between the first friction plate and the second friction plate in response to a torque disturbance induced by shifting a gear ratio of the transmission.

13. The electric vehicle according to claim 12, wherein the centrifugal clutch further comprises a base member coupled to the second friction plate for common rotation therewith about the axis, wherein the second friction plate is movable along the axis relative to the base member.

14. The electric vehicle according to claim 13, wherein the counterweight assembly includes a counterweight and a pivot member, the counterweight being coupled to the pivot member, the pivot member being coupled to the base member via a first pivot connection and coupled to the second friction plate via a second pivot connection.

15. The electric vehicle according to claim 14, wherein the counterweight assembly further comprises a transfer member, wherein a first end of the transfer member is coupled to the second friction plate and a second end of the transfer member is coupled to the pivot member at the second pivot connection.

16. The electric vehicle according to claim 13, wherein the second friction plate is axially between the base member and the first friction plate.

17. The electric vehicle according to claim 12, further comprising a control module configured to shift the transmission between the plurality of gear ratios, wherein the control module is configured to receive signals from a plurality of sensors and actively control motor output torque in response to the signals received from the plurality of sensors to actively control an amount of slipping of the centrifugal clutch during a gear shift of the transmission.

18. An electric vehicle comprising:
an electric drive motor;
a transmission switchable between a plurality of gear ratios; and
a centrifugal clutch drivingly coupled in a torque transmission path between the electric drive motor and the transmission, the centrifugal clutch including:
a first friction plate rotatable about an axis;
a second friction plate rotatable about the axis and axially movable relative to the first friction plate, the second friction plate being configured to frictionally engage the first friction plate to transmit torque therebetween;
a biasing member that applies a biasing force to the second friction plate that biases the second friction plate in a first axial direction that is toward the first friction plate; and
a counterweight assembly coupled to the second friction plate and configured to apply a counterweight force on the second friction plate in a second axial direction that is away from the first friction plate in response to a rotational speed of the second friction plate exceeding a predetermined rotational speed,
wherein the centrifugal clutch is configured to have a torque holding capacity that exceeds a torque output of the motor for all operational speeds of the motor but to permit slipping between the first friction plate and the second friction plate in response to a torque disturbance induced by shifting a gear ratio of the transmission,
wherein the centrifugal clutch includes a base member coupled to an output of the electric drive motor for common rotation therewith,
wherein the counterweight assembly includes a counterweight, a pivot member, and a transfer member, wherein the counterweight is coupled to the pivot member,
wherein the pivot member is coupled to the base member via a first pivot connection and coupled to the transfer member via a second pivot connection,
wherein a first end of the transfer member is coupled to the second friction plate and a second end of the transfer member is coupled to the pivot member at the second pivot connection.

19. The electric vehicle according to claim 18, further comprising a control module configured to shift the transmission between the plurality of gear ratios, wherein the control module is configured to receive signals from a plurality of sensors and actively control motor output torque in response to the signals received from the plurality of sensors to actively control an amount of slipping of the centrifugal clutch during a gear shift of the transmission.

* * * * *